United States Patent
Wang et al.

(10) Patent No.: US 10,817,643 B2
(45) Date of Patent: *Oct. 27, 2020

(54) METHOD OF DESIGNING SEMICONDUCTOR DEVICE AND SYSTEM FOR IMPLEMENTING THE METHOD

(71) Applicant: TAIWAN SEMICONDUCTOR MANUFACTURING CO., LTD., Hsinchu (TW)

(72) Inventors: Shao-Huan Wang, Hsinchu (TW); Sheng-Hsiung Chen, Zhubei (TW); Wen-Hao Chen, Hsin-Chu (TW); Chun-Chen Chen, Hsinchu (TW); Hung-Chih Ou, Hsinchu (TW)

(73) Assignee: TAIWAN SEMICONDUCTOR MANUFACTURING CO., LTD., Hsinchut (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,761

(22) Filed: May 13, 2019

(65) Prior Publication Data
US 2019/0266309 A1  Aug. 29, 2019

Related U.S. Application Data

(63) Continuation of application No. 15/616,907, filed on Jun. 7, 2017, now Pat. No. 10,289,794.
(Continued)

(51) Int. Cl.
*G06F 30/394* (2020.01)
*G06F 30/20* (2020.01)
(Continued)

(52) U.S. Cl.
CPC ............ *G06F 30/394* (2020.01); *G06F 30/20* (2020.01); *G06F 30/327* (2020.01);
(Continued)

(58) Field of Classification Search
CPC ............ H01L 23/5226; H01L 27/0207; H01L 23/522; H01L 27/02; G06F 2111/04;
(Continued)

(56) References Cited

U.S. PATENT DOCUMENTS 5,917,332 A   6/1999 Chen
8,030,773 B2 * 10/2011 Kurata ................ H01L 23/5226
                                                    257/758
(Continued)

OTHER PUBLICATIONS

Office Action dated May 13, 2020 from corresponding application No. TW 106126116.

*Primary Examiner* — Vuthe Siek
(74) *Attorney, Agent, or Firm* — Hauptman Ham, LLP

(57) ABSTRACT

A method including selecting a plurality of layout patterns, wherein each of the layout patterns comprises a corresponding via pillar structure that satisfies an electromigration (EM) rule, wherein each of the via pillar structures comprises metal layers and at least one via coupled to the metal layers. The method further includes selecting a layout pattern from the plurality of layout patterns having a smallest physical size. The method further includes performing a placement and routing process by using the selected layout pattern.

20 Claims, 4 Drawing Sheets

Related U.S. Application Data

(60) Provisional application No. 62/434,379, filed on Dec. 14, 2016.

(51) Int. Cl.
| | |
|---|---|
| *G06F 30/327* | (2020.01) |
| *G06F 30/392* | (2020.01) |
| *G06F 30/3312* | (2020.01) |
| *G06F 111/04* | (2020.01) |
| *G06F 119/12* | (2020.01) |
| *H01L 23/522* | (2006.01) |
| *H01L 27/02* | (2006.01) |

(52) U.S. Cl.
CPC ........ *G06F 30/3312* (2020.01); *G06F 30/392* (2020.01); *G06F 2111/04* (2020.01); *G06F 2119/12* (2020.01); *H01L 23/5226* (2013.01)

(58) Field of Classification Search
CPC .... G06F 2119/12; G06F 30/20; G06F 30/327; G06F 30/3312; G06F 30/392; G06F 30/394; G06F 17/5009; G06F 17/5031; G06F 17/505; G06F 17/5072; G06F 17/5077; G06F 2217/06; G06F 2217/84; G06F 111/12

See application file for complete search history.

(56) References Cited

U.S. PATENT DOCUMENTS

| | | |
|---|---|---|
| 8,713,498 B2 | 4/2014 | Shroff |
| 9,589,093 B2 * | 3/2017 | Hong ................... G06F 30/394 |
| 9,768,111 B2 | 9/2017 | O'Brien |
| 9,887,186 B2 * | 2/2018 | Chang ................. H01L 27/0207 |
| 2005/0118803 A1 | 6/2005 | Hichri et al. |
| 2006/0190846 A1 | 8/2006 | Hichri et al. |
| 2012/0153458 A1 | 6/2012 | Howard et al. |
| 2014/0252644 A1 | 9/2014 | O'Brien et al. |
| 2016/0086884 A1 | 3/2016 | O'Brien et al. |

\* cited by examiner

METHOD OF DESIGNING SEMICONDUCTOR DEVICE AND SYSTEM FOR IMPLEMENTING THE METHOD

This application is a continuation of U.S. application Ser. No. 15/616,907, filed Jun. 7, 2017, which claims priority to U.S. Provisional Application No. 62/434,379, filed Dec. 14, 2016, which are herein incorporated by reference in their entireties.

BACKGROUND

In conventional automatic placement and routing (APR) process, wide output pins are used to meet an electromigration (EM) rule. However, the wide output pins not only consume large layout area, but interfere with nearby routing tracks. Moreover, the wide output pins with a fixed shape are used in all of cells to meet the EM rule, which causes an overdesign of cells with light driving loads and wastes the layout area.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
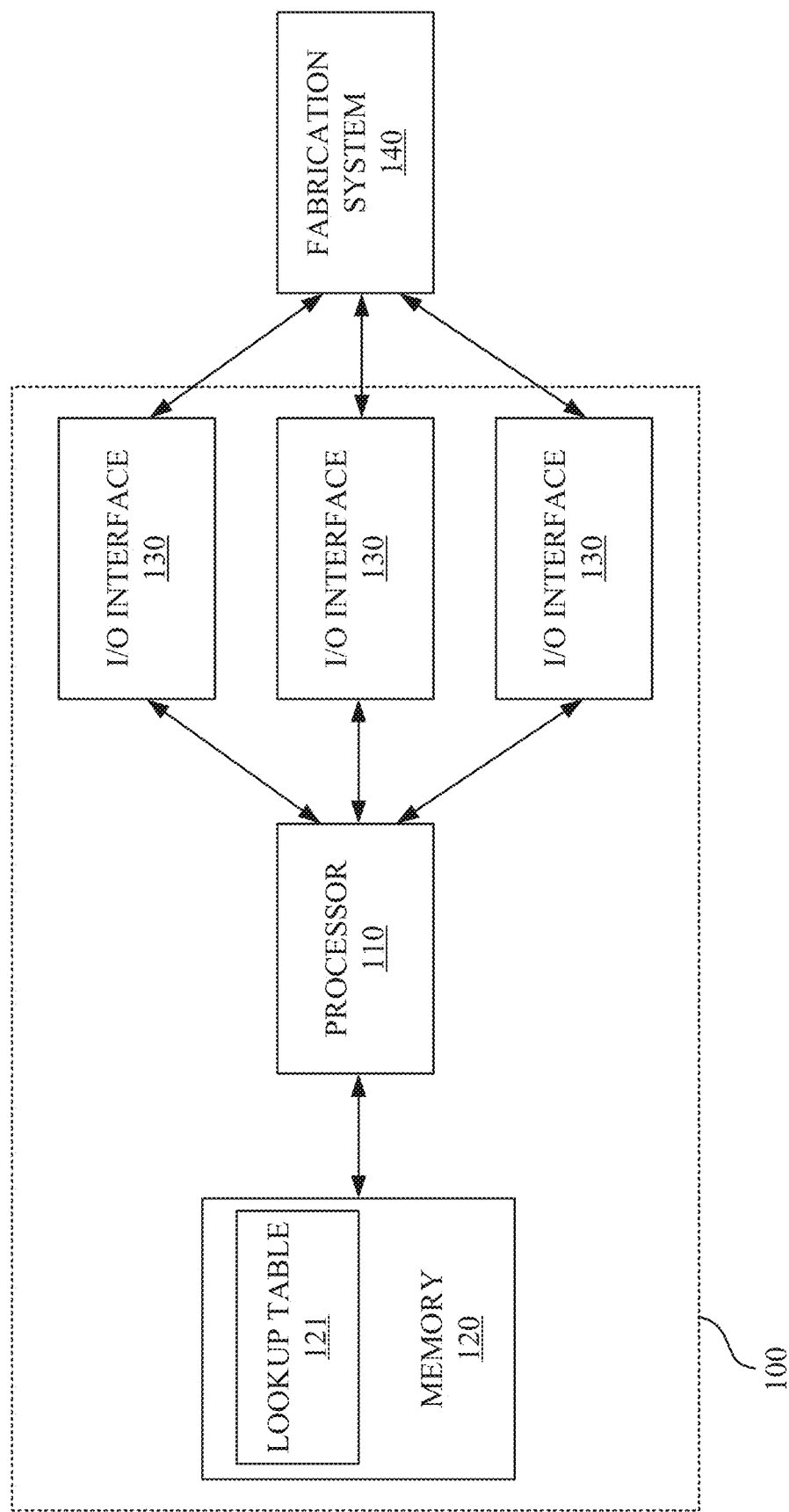
FIG. 1 is a schematic diagram of a system for performing layout of a semiconductor device, in accordance with some embodiments of the present disclosure.

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. The term mask, photolithographic mask, photomask and reticle are used to refer to the same item.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, that is, to mean including but not limited to.

Reference is made to FIG. 1. FIG. 1 is a schematic diagram of a system 100 for performing layout of a semiconductor device (not shown), in accordance with some embodiments of the present disclosure.

As illustratively shown in FIG. 1, the system 100 includes a processor 110, a memory 120, and input/output (I/O) interfaces 130. The processor 110 is coupled to the memory 120 and the I/O interfaces 130. The system 100 is coupled to a fabrication system 140 through the I/O interfaces 130. In various embodiments, the processor 110 is a central processing unit (CPU), an application specific integrated circuit (ASIC), a multi-processor, a distributed processing system, or a suitable processing unit. Various circuits or units to implement the processor 110 are within the contemplated scope of the present disclosure.

The memory 120 stores one or more program codes for aiding design of the layout of the semiconductor device or various integrated circuits. For illustration, the memory 120 stores a program code encoded with a set of instructions for performing layout process or checking layout patterns of the integrated circuits. The processor 110 is able to execute the program codes stored in the memory 120, and the operations of wire routing are able to be automatically performed.

In some embodiments, the memory 120 is a non-transitory computer readable storage medium encoded with, i.e., storing, a set of executable instructions for performing layout process or checking layout patterns. For illustration, the memory 120 stores executable instructions for performing operations including, for example, operations S301-S303 illustrated in FIG. 3. In some embodiments, the computer readable storage medium is an electronic, magnetic, optical, electromagnetic, infrared, and/or a semiconductor system (or apparatus or device). For example, the computer readable storage medium includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-R/W), a digital video disc (DVD), a flash memory, and/or other media, now known or later developed, that are capable of storing code or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The I/O interfaces 130 receive inputs or commands from various control devices (not shown) which, for example, are operated by a circuit designer and/or a layout designer. Accordingly, the system 100 is able to be controlled with the inputs or commands received by the I/O interfaces 130. In some embodiments, the I/O interfaces 130 include a display configured to display the status of executing the program code. In some embodiments, the I/O interfaces 130 include a graphical user interface (GUI). In some other embodiments, the I/O interfaces 130 include a keyboard, keypad, mouse, trackball, track-pad, touch screen, cursor direction keys, or the combination thereof, for communicating information and commands to the processor 110.

Figure 2A:
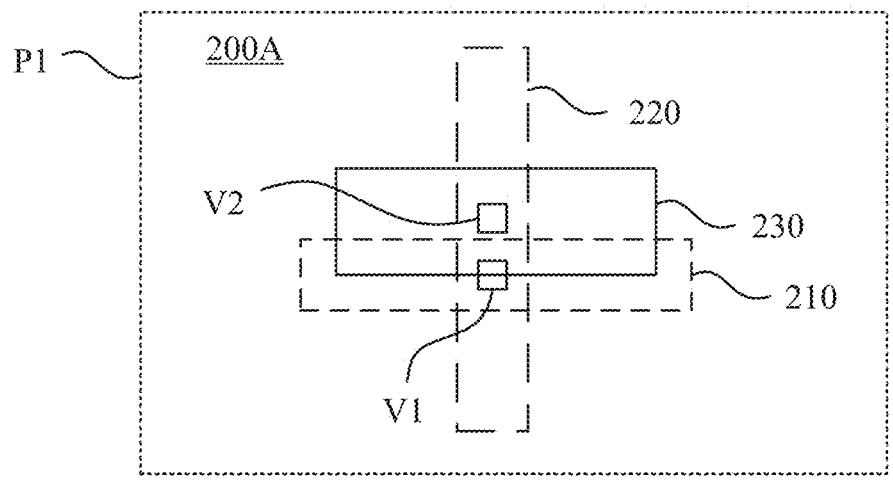
FIGS. 2A-2C are schematic diagrams of layout patterns placed and/or routed by using the system in FIG. 1, in accordance with various embodiments of the present disclosure.
Figure 2B:
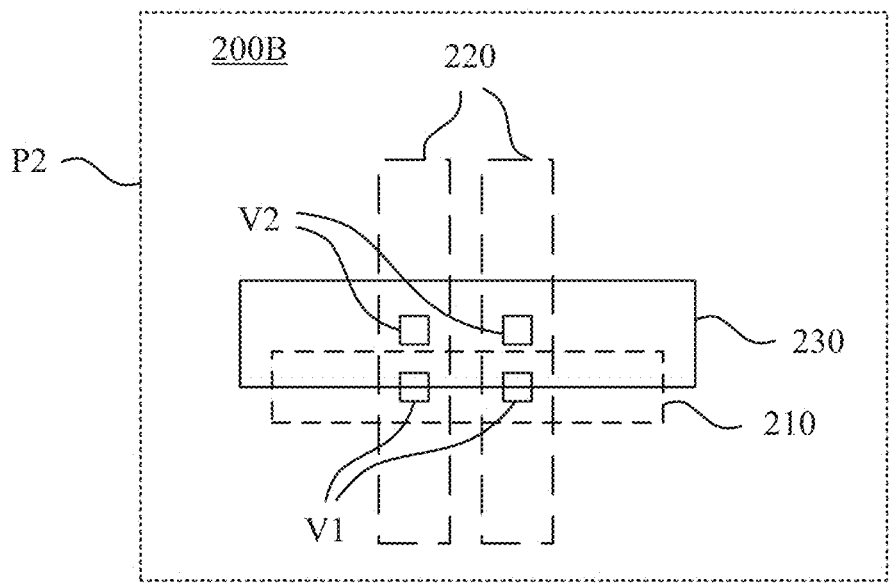
Figure 2C:
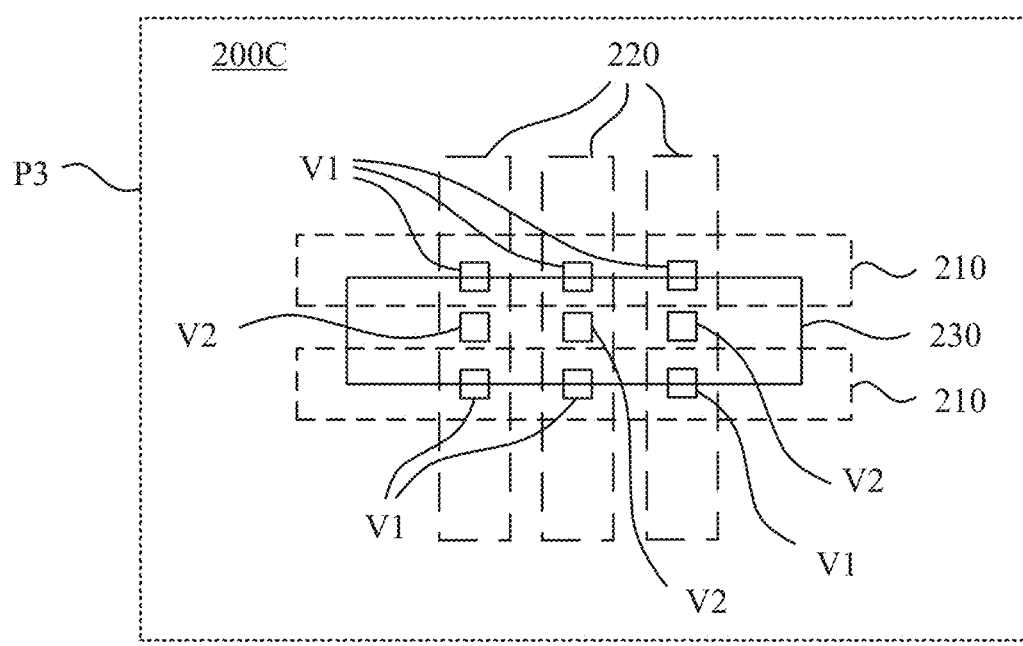

References are made to FIGS. 2A-2C. FIGS. 2A-2C are schematic diagrams of layout patterns P1, P2 and P3 placed and/or routed by using the system 100 in FIG. 1, in accordance with various embodiments of the present disclosure. With respect to the embodiments of FIGS. 2B and 2C, like elements in FIG. 2A are designated with the same reference numbers for ease of understanding.

As illustratively shown in FIG. 2A, in some embodiments, a layout pattern P1 indicating a via pillar structure 200A that includes metal layers 210, 220 and 230 and vias V1 and V2 is provided. In some embodiments, the metal layer 220 is disposed over the metal layer 210, and the metal layer 230 is disposed over the metal layer 220. The via V1 is disposed between the metal layers 210 and 220 and coupled to the metal layers 210 and 220. The via V2 is disposed between the metal layers 220 and 230 and coupled to the metal layers 220 and 230.

As illustratively shown in FIG. 2B, in some embodiments, another layout pattern P2 indicating a via pillar structure 200B that includes metal layers 210, 220 and 230 and vias V1 and V2 is provided. Compared to FIG. 2A, for illustration in FIG. 2B, two separate vias V1, two separate vias V2, and the metal layer 220 including two separate patterns are included in the via pillar structure 200B. The metal layer 220 is disposed over the metal layer 210, and the metal layer 230 is disposed over the metal layer 220. The vias V1 are disposed between the metal layers 210 and 220, and coupled to the metal layers 210 and 220. The vias V2 are disposed between the metal layers 220 and 230, and coupled to the metal layers 220 and 230.

As illustratively shown in FIG. 2C, in some embodiments, another layout pattern P3 indicating a via pillar structure 200C that includes metal layers 210, 220 and 230 and vias V1 and V2 is provided. Compared to FIG. 2A, for illustration in FIG. 2C, six separate vias V1, three separate vias V2, the metal layer 210 including two separate patterns, and the metal layer 220 including three separate patterns are included in the via pillar structure 200B. The metal layer 220 is disposed over the metal layer 210, and the metal layer 230 is disposed over the metal layer 220. The vias V1 are disposed between the metal layers 210 and 220, and coupled to the metal layers 210 and 220. The vias V2 are disposed between the metal layers 220 and 230, and coupled to the metal layers 220 and 230.

Numbers and configurations of the vias and metal layers in FIGS. 2A-2C are given for illustrative purposes. Various numbers and configurations of the vias and metal layers in FIGS. 2A-2C within the contemplated scope of the present disclosure. Alternatively stated, various layout patterns are within the contemplated scope of the present disclosure.

In some embodiments, the layout pattern P3 is larger than the layout pattern P2, and the layout pattern P2 is larger than the layout pattern P1. Correspondingly, the via pillar structure 200C is larger than the via pillar structure 200B, and the via pillar structure 200B is larger than the via pillar structure 200A.

In operation, the via pillar structures 200A, 200B and 200C are configured to allow maximum currents flow therethrough, and in the meantime, an electromigration (EM) rule is met. In some embodiments, meeting the EM rule indicates that an EM effect does not occur during normal operation of the semiconductor device. In some embodiments, the maximum currents flowing through the via pillar structures 200A, 200B and 200C, which meet the electromigration (EM) rule, are different. In some embodiments, the processor 110 in FIG. 1 is configured to execute the instructions for simulating the maximum currents that flow through the via pillar structures 200A, 200B and 200C and also meet the EM rule.

For illustration, the via pillar structure 200C is larger than the via pillar structure 200B, and the via pillar structure 200B is larger than the via pillar structure 200A. Accordingly, the maximum current that flow through the via pillar structure 200C and meet the EM rule is larger than the maximum current that flow through the via pillar structure 200B and meet the EM rule. The maximum current that flow through the via pillar structure 200B and meet the EM rule is larger than the maximum current that flow through the via pillar structure 200A and meet the EM rule. With different layout patterns indicating different via pillar structures including, but not limited to, the via pillar structures 200A, 200B and 200C for meeting the EM rule, different maximum currents are able to be obtained according to different driving loads of cells. Explained in a different way, based on different driving loads required for one cell to operate in different conditions, various via pillar structures are able to be designed and selected to meet different EM rules.

In some embodiments, the term "cell" discussed above is referred to as a circuit unit. In some embodiments, the cell is configured to provide a logical functionality. For illustration, in some embodiments, the cell includes a NAND gate, a NOR gate, a latch, or an inverter, etc.

Figure 3:
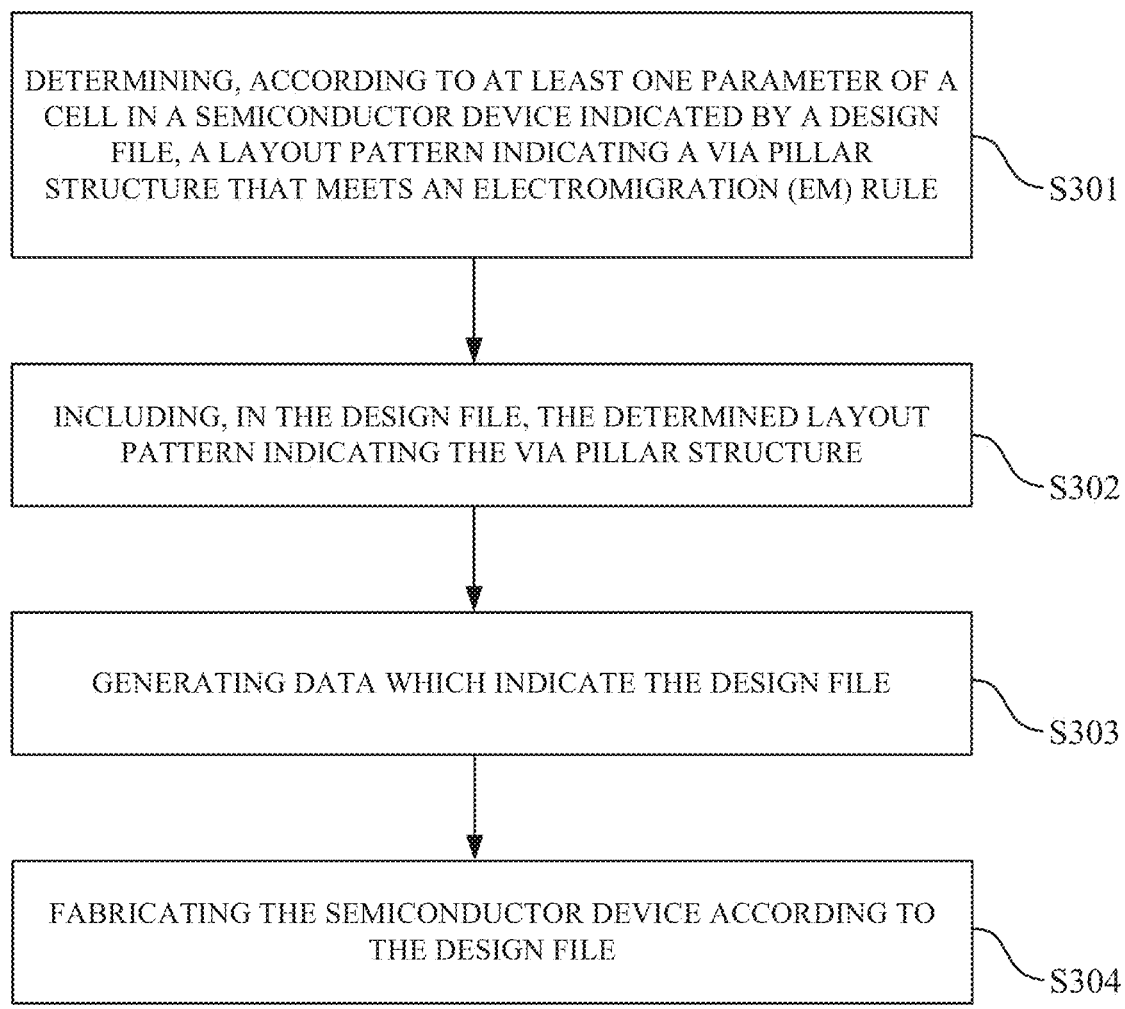
FIG. 3 is a flow chart illustrating a method 300 for performing layout of the semiconductor device by using the system in FIG. 1, in accordance with various embodiments of the present disclosure.

Reference is made to FIG. 3. FIG. 3 is a flow chart illustrating a method 300 for performing layout of the semiconductor device by using the system 100 in FIG. 1, in accordance with various embodiments of the present disclosure. The method 300 includes operations S301, S302, S303 and S304. For ease of understanding, the method 300 is explained below with reference to FIG. 1 and FIGS. 2A-2C.

These operations are given for illustrative purposes. Additional operations are within the contemplated scoped of the present disclosure. For example, in various embodiments, additional operations are provided before, during, and/or after the operations in the method 300, and/or some of the operations described are replaced or eliminated for other embodiments of the method 300.

In operation S301, the processor 110 executes the instructions for determining, according to at least one parameter of a cell in a semiconductor device indicated by a design file, a layout pattern indicating a via pillar structure that meets an electromigration (EM) rule. The layout pattern determined in operation S301 is referred to as one of the layout patterns P1-P3 in FIGS. 2A-2C, in some embodiments.

The parameter of the cell, as discussed above, is associated with configurations and/or operations of the cell. In some embodiments, the processor 110 is configured to execute the instructions for determining the layout pattern discussed above, according to a driving load of the cell in the semiconductor device indicated by the design file. In various embodiments, the processor 110 is configured to execute the instructions for determining the layout pattern discussed above, according to a clock frequency of the cell in the semiconductor device indicated by the design file. In some embodiments, the processor 110 is configured to execute the instructions for determining the layout pattern discussed above, according to a data toggle rate of the cell in the semiconductor device indicated by the design file. In some embodiments, the processor 110 is configured to execute the instructions for determining the layout pattern discussed above, according to a combination of the driving load, the clock frequency and the data toggle rate of the cell in the semiconductor device indicated by the design file. The aforementioned parameters of the cell are given for illustrative purposes only. Various parameters of the cell are within the contemplated scope of the present disclosure. For example, in various embodiments, the parameters also include temperature, operating voltage, process variation, etc.

In some embodiments, the processor 110 is configured to execute the instructions for estimating the driving load, and then determining the layout pattern according to the estimated driving load. For illustration, when the driving load is determined to be a light load, the layout pattern is then determined as, for example, the layout pattern P1 illustrated in FIG. 2A. When the driving load is determined to be a heavy load, the layout pattern is then determined as, for example, the layout pattern P3 illustrated in FIG. 2C.

In some embodiments, the processor 110 is further configured to execute the instructions for using a lookup table 121 to determine the layout pattern indicating the via pillar structure with a minimum size that corresponds to the driving load of the cell. In some embodiments, the lookup table 121 stores various layout patterns including, for example, the layout patterns P1, P2 and P3 as discussed above. In some embodiments, the lookup table 121 also stores the parameters of the cell corresponding to the layout patterns. For example, TABLE 1 shown below is configured as the lookup table 121 used to determine the layout pattern corresponding to the driving load.

In some embodiments, when more than one layout pattern meets the EM rule in some conditions, the processor 110 determines the layout pattern indicating the via pillar structure with a minimum size that corresponds to the driving load of the cell. For illustration, in a condition in which the operating voltage is 0.9 V and the temperature is 125° C., if the processor 110 executes the instructions to estimate that the driving load of the cell is 10 fF, and the clock frequency is 0.3 ns and the data toggle rate is 10%, then the layout patterns P2 and P3 both satisfy the requirements of layout. To meet the EM rule with the minimum size of the layout pattern, with reference to TABLE 1 as shown below, the processor 110 uses TABLE 1 to determine the layout pattern P2 indicating the via pillar structure 200B to be used in the layout.

TABLE 1

| Driving load | Clock frequency | Data toggle rate | Layout pattern |
|---|---|---|---|
| 10 fF | 0.2 ns | 10% | P1 |
| 10 fF | 0.2 ns | 20% | P2 |
| 10 fF | 0.3 ns | 10% | P2 |
| 10 fF | 0.3 ns | 20% | P3 |
| 20 fF | 0.2 ns | 10% | P2 |
| 20 fF | 0.2 ns | 20% | P3 |

With reference to the method 300 in FIG. 3, in operation S302, the processor 110 executes the instructions for including, in the design file, the determined layout pattern indicating the via pillar structure. For illustration, the processor 110 executes the instructions for including, in the design file, the determined layout pattern P2 indicating the via pillar structure 200B.

In operation S303, the processor 110 executes the instructions for generating data which indicate the design file.

In some embodiments, the processor 110 sends the design file to the fabrication system 140 through the I/O interfaces 130. In operation S304, the fabrication system 140 fabricates the semiconductor device according to the layout design. In some embodiments, the fabrication system 140 includes or is implemented by a fabrication equipment including, for example, chamber.

While the methods provided herein are illustrated and described above as a series of acts or events, it will be appreciated that the illustrated ordering of such acts or events are not to be interpreted in a limiting sense. The operations are not necessarily performed in the order described. For example, some acts occur in different orders and/or concurrently with other acts or events apart from those illustrated and/or described herein. In addition, not all illustrated acts may be required to implement one or more aspects or embodiments of the description herein. Further, in some embodiments, one or more of the acts depicted herein is carried out in one or more separate acts and/or phases. Alternatively stated, the order of the operations disclosed in the present disclosure are able to be changed, or the operations are able to be executed simultaneously or partially simultaneously as appropriate, in accordance with the spirit and scope of various embodiments of the present disclosure.

In some approaches, wide output pins are used to meet the EM rule. However, the wide output pins not only consume large layout area, but interfere with nearby routing tracks. Moreover, the wide output pins with a fixed shape are used in all of cells to meet the EM rule, which causes an overdesign of cells with light driving loads and wastes the layout area.

Compared to the aforementioned approaches, the processor 110 dynamically determines the layout pattern indicating the via pillar structure that meets the EM rule and has a minimum size according to the driving load of the cell in the design file. Explained in a different way, according to different driving loads, the processor 110 dynamically determines corresponding layout patterns indicating the via pillar structures, in which each of the via pillar structures is provided to meet the EM rule and have a minimum size. As a result, with the via pillar structure having the minimum size and meeting the EM rule, layout area of the layout patterns is effectively saved, and problem of overdesign for the design file is also prevented, compared to the some approaches.

In various embodiments, the processor 110 is configured to execute the instructions for providing various layout patterns indicating via pillar structures, respectively, that are different from each other and corresponding to different driving loads. For illustration in FIGS. 2A, 2B and 2C, the processor 110 executes the instructions for providing the layout patterns P1, P2 and P3 indicating the via pillar structures 200A, 200B and 200C, respectively, to be selected for layout with respect to different driving loads.

In some embodiments, according to a driving load configured for a cell in a semiconductor device, the processor 110 is further configured to execute the instructions for selecting a layout pattern from the provided layout patterns, in which the selected layout pattern is configured to be coupled to the cell. The selected layout pattern indicates a corresponding via pillar structure of the via pillar structures and meets the EM rule. In further embodiments, the processor 110 estimates the driving load of the cell in the semiconductor device, and then selects the layout pattern from the layout patterns according to the estimated driving load. For illustration, if clock frequency is 0.2 ns, data toggle rate is 10% and the processor 110 estimates that the driving load of the cell is 10 fF, then the processor 100 accesses TABLE 1 as shown above, and selects the corresponding layout pattern P1.

In various embodiments, the processor 110 is configured to execute the instructions for, based on the driving load, clock frequency, data toggle rate, operating voltage, temperature, and a combination thereof of the cell, selecting a via pillar structure that meets the EM rule. In some embodiments, the selected via pillar structure has a minimum size required for meeting the EM rule, compared to other pillar structures for selection. In some embodiments, the processor 110 is configured to execute the instructions for using a lookup table 121 to determine the selected layout pattern. For illustration, in a condition in which the operating voltage is 0.9 V and the temperature is 125° C., if the processor 110 executes the instructions to estimate that the driving load of the cell is 10 fF, and the clock frequency is 0.3 ns and the data toggle rate is 20%, the processor 110 executes the instructions for using the lookup table 121, e.g., TABLE 1, to determine the layout pattern P3 indicating the via pillar structure 200C to be used in layout of the semiconductor device.

Afterwards, the processor 110 executes the instructions for generating a layout design comprising the cell and the selected layout pattern which indicates the corresponding via pillar structure. With the layout design, the fabrication system 140 is able to fabricate the semiconductor device according to the layout design.

In various embodiments, the processor 110 is configured to execute the instructions for accessing the lookup table 121 as discussed above, and selecting, from the lookup table 121, a layout pattern indicating a via pillar structure that corresponds to a driving load of a cell in a semiconductor device and has a minimum size required to meet the EM rule. For illustration, corresponding to a driving load, the processor 110 selects one of the layout patterns P1, P2 and P3 from TABLE 1 as shown above, which has a minimum size required to meet the EM rule. Alternatively stated, when the size of the layout pattern P1 is minimum required to meet the EM rule based on the driving load, compared to the sizes of the layout patterns P2 and P3, the layout pattern P1 is then selected to be placed in the layout of the semiconductor device. Afterwards, the processor 110 executes the instructions for performing a placement and routing process by using the selected layout pattern P1, in order to generate the layout design.

In some embodiments, if the driving load of the cell changes, the processor 110 is configured to execute the instructions for replacing the selected layout pattern with a different layout pattern indicating a different via pillar structure that meets the EM rule. For illustration, if the driving load of the cell changes from a light load to a heavy load so that the layout pattern P1 does not meet the EM rule, then the processor 110 executes the instructions for replacing the layout pattern P1 with the layout pattern P2 indicating the via pillar structure 200B. If the layout pattern P2 indicating the via structure 200B does not meet the EM rule when the cell has the heavy driving load, then the processor 110 is configured to execute the instructions for replacing the layout pattern P1 with the layout pattern P3 indicating the via pillar structure 200C.

In contrast, for illustration, if the determined layout pattern is the layout pattern P2 and the driving load of the cell changes from a heavy load to a light load so that the layout patterns P1, P2 and P3 all meet the EM rule, then the processor 110 is configured to execute the instructions for replacing the layout pattern P2 with the layout pattern P1 indicating the via pillar structure 200A that meets the EM rule, because the layout pattern P1 consumes a smaller layout area than the layout pattern P2 does. Based on the above, the processor 110 dynamically adjusts the size of the layout pattern indicating the via pillar structure according to the driving load of the cell so as to effectively save the layout area in the design file.

In some embodiments, the method 300 is integrated with an automatic placement and routing (APR) process. The APR flow includes a synthesis stage, a floorplan stage, a placement stage, a clock tree synthesis stage, a routing stage and a timing optimization stage. For illustration, the processor 110 executes the instructions to perform operation S301 in the synthesis stage and the placement stage of the APR process. Explained in a different way, the processor 110 executes the instructions to estimate the driving load and routing resources of the cell, and to estimate routing resources of the via pillar structure based on the estimated driving load of the cell in the synthesis stage. Then, in the placement stage, when a location of the cell is determined, the routing resources of the via pillar structure estimated by the processor 110 has a higher accuracy for determining the layout pattern indicating the via pillar structure that meets the EM rule.

In some embodiments, the processor 110 executes the instructions to perform operation S302 in the clock tree synthesis stage and the routing stage of the APR process. Explained in a different way, the processor 110 executes the instructions to take into consideration, a clock net routing and a signal net routing of the cell as well as the layout pattern indicating the via pillar structure, in order to optimize routing resources of the cell and meet the EM rule.

In some embodiments, the processor 110 executes the instructions to change the via pillar structure when the cell is changed to fix timing violations in the timing optimization stage of the APR process. For illustration, if the cell is replaced with another cell with a heavy driving load to fix timing violations in the timing optimization stage, the processor 110 replaces the layout pattern with another layout pattern indicating another via pillar structure that has larger size and meets the EM rule. In contrast, if the cell is replaced with another cell with a light driving load to fix timing violations in the timing optimization stage, the processor 110 replaces the layout pattern with another layout pattern indicating another via pillar structure that has light size and meets the EM rule. Explained in a different way, the processor 110 is configured to execute the instructions for dynamically sizing up and/or size down the layout pattern indicating the via pillar structure according change in the driving load of the cell.

In some embodiments, the processor 110 determines candidates of the via pillar structure in the synthesis stage and the placement stage, includes the determined via pillar in the design file in the clock tree synthesis stage and the routing stage, and optimizes the via pillar structure in the timing optimization stage.

Based on the above embodiments, the processor 110 dynamically determines the layout pattern indicating the via pillar structure that meets the EM rule and has a minimum size according to the driving load and/or other parameters of the cell in the design file. In addition, the processor 110 integrates the method of dynamically determining the via pillar structure with the minimum size with the automatic placement and routing (APR) process to determine the via pillar structure and the routing resource thereof that meet the EM rule more effectively than a conventional APR process. As a result, layout area of the design file is effectively saved, and problem of overdesign is also prevented in the present disclosure.

An aspect of this description relates to a method including selecting a plurality of layout patterns, wherein each of the layout patterns comprises a corresponding via pillar structure that satisfies an electromigration (EM) rule, wherein each of the via pillar structures comprises metal layers and at least one via coupled to the metal layers. The method further includes selecting a layout pattern from the plurality of layout patterns having a smallest physical size. The method further includes performing a placement and routing process by using the selected layout pattern. In some embodiments, the method further includes determining the EM rule for each of the plurality of layout patterns. In some embodiments, the performing the placement and routing process comprises performing the placement and routing process with an automatic placement and routing (APR) tool. In some embodiments, the method further includes identified the plurality of layout patterns based on at least one of a driving load, a clock frequency or a data toggle rate of each of the plurality of layout patterns. In some embodiments, the selecting the plurality of layout patterns comprises selecting the plurality of layout patterns from a look up table.

An aspect of this description relates to a system including a computer readable medium configured to store instructions; and a processor connected to the computer readable medium. The processor is configured to execute the instructions for determining, according to at least one parameter of a cell in a semiconductor device, a plurality of layout patterns that meets an electromigration (EM) rule. The processor is configured to execute the instructions for selecting a layout pattern of the plurality of layout patterns that meet the EM rule having a smallest physical size, wherein the selected layout pattern includes a via pillar structure. The processor is configured to execute the instructions for including, in a design file, the layout pattern indicating the via pillar structure. In some embodiments, the parameter of the cell comprises a driving load. In some embodiments, the parameter of the cell comprises at least one of a clock frequency, a data toggle rate, an operating voltage or a temperature. In some embodiments, the processor is configured to execute the instructions for performing a placement and routing process using an automatic placement and routing (APR) tool. In some embodiments, the computer readable medium is configured to store the plurality of layout patterns in a look up table. In some embodiments, the computer readable medium is configured to store each of the plurality of layout patterns in the look up table associated with a corresponding at least one of a driving load, a clock frequency, a data toggle rate, an operating voltage or a temperature.

An aspect of this description relates to a method including receiving a layout design. The method further includes receiving a plurality of layout patterns, wherein each layout pattern of the plurality of layout patterns includes a via pillar structure. The method further includes determining whether a driving load of a via pillar structure of a first layout pattern of the plurality of layout patterns meets an electromigration (EM) rule. The method further includes determining whether a driving load of a via pillar structure of a second layout pattern of the plurality of layout patterns meets the EM rule. The method further includes replacing the first layout pattern with the second layout pattern in response to a physical size of the second layout pattern being less than a physical size of the first layout pattern. The method further includes updating the layout design to include the second layout pattern. In some embodiments, the receiving the plurality of layout patterns comprises receiving the plurality of layout patterns from a computer readable medium. In some embodiments, the method further includes maintaining the first layout pattern in the layout design in response to the physical size of the second layout pattern being greater than the physical size of the first layout pattern. In some embodiments, the method further includes performing placement and routing using the updated layout design. In some embodiments, the performing placement and routing comprises performing placement and routing using an automatic placement and routing (APR) tool. In some embodiments, replacing the first layout pattern with the second layout pattern comprises reducing a number of vias in a via structure of the layout design. In some embodiments, the method further includes generating a look up table for storing the plurality of layout patterns. In some embodiments, the generating the look up table comprises generating the look up table based on at least one of a driving load, a clock frequency, a data toggle rate, an operating voltage or a temperature. In some embodiments, the generating the look up table comprises generating the look up table based on a driving load of a via structure for a corresponding layout pattern of the plurality of layout patterns.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    selecting a plurality of layout patterns, wherein each of the layout patterns comprises a corresponding via pillar structure that satisfies an electromigration (EM) rule, wherein each of the via pillar structures comprises metal layers and at least one via coupled to the metal layers;
    selecting a layout pattern from the plurality of layout patterns having a smallest physical size; and performing a placement and routing process by using the selected layout pattern.

2. The method of claim 1, further comprising determining the EM rule for each of the plurality of layout patterns.

3. The method of claim 1, wherein the performing the placement and routing process comprises performing the placement and routing process with an automatic placement and routing (APR) tool.

4. The method of claim 1, further comprising identified the plurality of layout patterns based on at least one of a driving load, a clock frequency or a data toggle rate of each of the plurality of layout patterns.

5. The method of claim 1, wherein the selecting the plurality of layout patterns comprises selecting the plurality of layout patterns from a look up table.

6. A system, comprising:
a computer readable medium configured to store instructions;
a processor connected to the computer readable medium, wherein the processor is configured to execute the instructions for:
determining, according to at least one parameter of a cell in a semiconductor device, a plurality of layout patterns that meets an electromigration (EM) rule;
selecting a layout pattern of the plurality of layout patterns that meet the EM rule having a smallest physical size, wherein the selected layout pattern includes a via pillar structure; and
including, in a design file, the layout pattern indicating the via pillar structure.

7. The system of claim 6, wherein the parameter of the cell comprises a driving load.

8. The system of claim 6, wherein the parameter of the cell comprises at least one of a clock frequency, a data toggle rate, an operating voltage or a temperature.

9. The system of claim 6, wherein the processor is configured to execute the instructions for performing a placement and routing process using an automatic placement and routing (APR) tool.

10. The system of claim 6, wherein the computer readable medium is configured to store the plurality of layout patterns in a look up table.

11. The system of claim 10, wherein the computer readable medium is configured to store each of the plurality of layout patterns in the look up table associated with a corresponding at least one of a driving load, a clock frequency, a data toggle rate, an operating voltage or a temperature.

12. A method, comprising:
receiving a layout design;
receiving a plurality of layout patterns, wherein each layout pattern of the plurality of layout patterns includes a via pillar structure;
determining whether a driving load of a via pillar structure of a first layout pattern of the plurality of layout patterns meets an electromigration (EM) rule;
determining whether a driving load of a via pillar structure of a second layout pattern of the plurality of layout patterns meets the EM rule;
replacing the first layout pattern with the second layout pattern in response to a physical size of the second layout pattern being less than a physical size of the first layout pattern;
updating the layout design to include the second layout pattern.

13. The method of claim 12, wherein the receiving the plurality of layout patterns comprises receiving the plurality of layout patterns from a computer readable medium.

14. The method of claim 12, further comprising maintaining the first layout pattern in the layout design in response to the physical size of the second layout pattern being greater than the physical size of the first layout pattern.

15. The method of claim 12, further comprising performing placement and routing using the updated layout design.

16. The method of claim 15, wherein the performing placement and routing comprises performing placement and routing using an automatic placement and routing (APR) tool.

17. The method of claim 12, wherein replacing the first layout pattern with the second layout pattern comprises reducing a number of vias in a via structure of the layout design.

18. The method of claim 12, further comprising generating a look up table for storing the plurality of layout patterns.

19. The method of claim 18, wherein the generating the look up table comprises generating the look up table based on at least one of a driving load, a clock frequency, a data toggle rate, an operating voltage or a temperature.

20. The method of claim 18, wherein the generating the look up table comprises generating the look up table based on a driving load of a via structure for a corresponding layout pattern of the plurality of layout patterns.

* * * * *